United States Patent Office 3,141,002
Patented July 14, 1964

---

3,141,002
FOAMABLE COMPOSITION COMPRISING A THERMOPLASTIC POLYMER AND BARIUM AZOCARBONATE AND METHOD OF FOAMING
Henry A. Hill, Watertown, Mass., assignor, by mesne assignments, to National Polychemicals, Inc.
No Drawing. Filed July 7, 1959, Ser. No. 825,413
4 Claims. (Cl. 260—2.5)

This invention relates to the production of cellular plastomeric products, including sponge rubber or cellular rubber made from natural or synthetic rubber, as well as foam masses of other plastics, resins, and the like.

A major scientific achievement in the plastics field has been the development of the hydrocarbon polymers, such as polyethylene and polypropylene. These developments have included the Ziegler, Natta, and Phillips Processes, and as applied to polyethylene have resulted in a high-melting, higher-density product. Owing to the higher melting points of materials, such as the high-density polyethylenes and the polypropylenes, efforts to produce blown foams and sponges from these materials have not been successful. In certain applications, processing temperatures in the range of 450–500° F. are required, and hitherto no blowing agent has been available which is operable in this processing range.

The present invention provides a blowing agent suitable for use with high melting polymers such as polyethylene (melting point 255–265° F.), polypropylene (melting point 325–340° F.) and "Type 6" nylon, which is derived from caprolactam (melting point 390–425° F.). The blowing agent of this invention is also suitable for use in blowing other plastomers such as rubber, vinyl resins, and other thermoplastics suitable for the production of blown products. The blowing agent utilized in this invention is barium azocarbonate, which it has been found will readily disperse in the stock by conventional means and is moreover economical, and of good stability. The decomposition of barium azocarbonate will occur at temperatures as high as 475–525° F., but lower blowing temperatures will also be provided for by incorporating other compounds containing acidic or active hydrogens, such as stearic acid or ethylene glycol.

In practice the barium azocarbonate, in an amount to produce the desired degree of blowing, typically between 1 and 15 parts per 100 parts of plastomer, is mixed uniformly into the plastomer which is then sheeted or otherwise formed to the desired shape and then heated to activate the blowing agent. The blown product is odorless and of uniform closed cell structure and is not at all discolored by the blowing agent.

A particularly advantageous property of hydrocarbon polymers, such as polyethylene and polypropylene blown with barium azocarbonate, is a markedly improved stability against degradation that normally occurs in the presence of heat and light. An important field of application for these blown high melting hydrocarbon polymers is in wire coating where advantage may be taken of the good electrical properties, such as low dielectric constant, and low power factor loss, possessed by materials of this type. Blown hydrocarbon polymers have not only the desirable electrical properties but their use also means that less material is required and improved flexibility of the coated wire is obtained.

Although barium azocarbonate is known in the art, a product suitable for the present invention is preferably produced directly by the reaction between barium oxide and azodicarbonamide according to the reaction

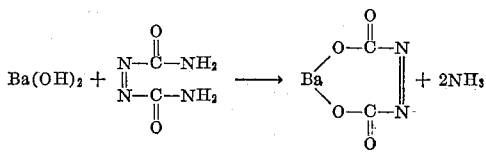

The production of barium azocarbonate and its use in numerous types of plastomer compositions are described in detail below. The examples herein are presented as exemplary of this invention, and it is contemplated that the formulations given may be modified in accordance with the understanding of those skilled in the art and familiar with this disclosure.

PREPARATION OF BARIUM AZOCARBONATE

Example I

To 4500 parts of water are added 361 parts of commercial barium oxide. The mixture is heated to 80° C. and filtered, giving a solution containing 344 parts of barium oxide, having a pH of 12.8. The water insoluble filter residue is discarded. After the filtered solution has been cooled to 25° C., 247.8 parts of the azodicarbonamide are added. The mixture is maintained at 25° C. while being stirred for one hour. The progress of the reaction may be followed by making use of the fact that the azodicarbonamide is soluble in dimethyl sulfoxide while barium azocarbonate is not soluble in this solvent. This differential solubility makes it possible to separate the product quantitatively. In a typical reaction, the percentage of azodicarbonamide remaining is found to be in 2 minutes, 28.7%; 4 minutes, 11.4%; 6 minutes, 3.2%; 8 minutes, 1.4%; 10 minutes, 0.9%. At the end of 1 hour, the batch is filtered, sucked dry, and held on the filter to retain about 1 part of the mother liquor for 1½ of the product. The mother liquor has a pH of 11.4 as opposed to a pH of 12.8 of the starting solution. The wet filter cake is either washed with acetone, or alternatively re-slurried in acetone and re-filtered, and then subsequently dried. Two parts of the dried product re-slurried in 100 parts of water gives a pH of 9.5.

Example II

The procedure given above is followed with the exception that the filtered solution of barium hydroxide is cooled to the temperature range of 3° C. to 10° C. before the addition of the azodicarbonamide. The progress of the reaction followed as before by the differential solubility of azodicarbonamide and barium azocarbonate in dimethyl sulfoxide, gives the following results: At the end of 2 hours, 25% unreacted; at the end of 4 hours, 20% unreacted; at the end of 6 hours, 15.2% unreacted;

at the end of 8 hours, 9.3% unreacted; at the end of 10 hours, 0.7% unreacted; at the end of 12 hours, 0.7% unreacted. The bath is held at temperatures of between 3° C. to 10° C. for 12 hours, filtered, sucked dry, either washed with or re-slurried in acetone and filtered and then dried. The product of previous run has a deep yellow color; the product of present run has a very light yellow color, indicating that the product made at the lower temperature has a much finer particle size.

PRODUCTION OF BLOWN PLASTOMERS

Example I

The effectiveness of barium azocarbonate as a blowing agent for polyolefin resins is shown in the following formulations:

| Ingredient: | Parts by Weight | | |
|---|---|---|---|
| | Test C | Test D | Test E |
| DYNH-1 [a] | 100.0 | | |
| Marlex 50 [b] | | 100.0 | |
| Pro-Fax [c] | | | 100.0 |
| Barium azocarbonate | 3.0 | 3.0 | 3.0 |
| | 103.0 | 103.0 | 103.0 |
| Specific gravity, 70° F./70° F. (calculated) | 0.94 | 0.98 | 0.93 |
| Temperature, °F | 475 | 525 | 525 |
| Time, minutes | 10 | 10 | 10 |
| Specific gravity, 70° F./70° F. | 0.58 | 0.60 | 0.44 |
| Color | White | White | White |

[a] Low density polyethylene.
[b] High density polyethylene.
[c] Polypropylene.

The resin was heated to its melting point on the rolls of steam-heated rubber mill. When molten, the blowing agent was incorporated and mixing continued until good dispersion was obtained. The mixture of resin and blowing agent was sheeted from the mill, cooled, and cut into sections. To expand the plastic, the mixture of plastic and blowing agent was heated in a 3 x 3 x 0.075" mold to the desired temperature under a pressure of 940 p.s.i. and held for the indicated time. The pressure was then reduced to atmospheric and the plastic was permitted to expand. The mold was cooled and the blown sample withdrawn. When the mold cavity was filled to only 50% of its volume, the pressure was not released to permit expansion but the full pressure of 940 p.s.i. was maintained throughout the cycle, the pressure being dropped only after cooling.

Example II

Polypropylene was tumbled with 2% of its weight of barium azocarbonate. The mixture of plastic and blowing agent was fed to a cross-head extruder for coating on wire. It was found under the conditions of the test that barium azocarbonate starts to decompose at 492° F. The best results were obtained in the following operating conditions—forward pressure 2000# p.s.i., medium pressure 1600# p.s.i., stock temperature 538° F., the head temperature of 520° F. Temperature in Zone 1, 500° F.; temperature in Zone 2, 430° F.; screw speed, 43 r.p.m. It is to be noted that while polypropylene was being expanded with barium azocarbonate, tests were run that indicated that no more than 0.5 to a maximum of one part of carbon monoxide per ten thousand parts of air were detected in the vicinity of the extruder head. This is well within the allowable maximum of one hundred parts per million.

Example III

The effectiveness of barium azocarbonate as a blowing agent for a styrene-butadiene rubber is shown by the following formulations:

| | Parts by Weight | |
|---|---|---|
| | Test F | Test G |
| Ingredient: | | |
| Styrene butadiene rubber 1502 [a] | 15.0 | |
| Styrene butadiene rubber 3110 [b] | 85.0 | |
| Styrene butadiene rubber 181 [c] | | 100.0 |
| Styrene butadiene resin [d] | 15.0 | |
| Coumarone-Indene resin | 10.0 | 10.0 |
| (Soft point 250–270° F.) were mixed on a rubber mill for 7.5 minutes at 250° F. The mill was then cooled to 150° F. and then were added: | | |
| Hydrated silica | 30.0 | |
| Hard clay | 90.0 | |
| Soft clay | | 110.0 |
| Titanium dioxide pigment | 10.0 | |
| Zinc oxide | 5.0 | 5.0 |
| Processing oil, light | 15.0 | |
| Petrolatum | | 8.0 |
| Processing oil, medium | | 15.0 |
| Antioxidant, non-staining | 1.0 | 1.0 |
| Phthalic anhydride | 1.0 | |
| Stearic acid | 4.0 | 4.0 |
| Diethylene glycol | 1.25 | 5.0 |
| The bath temperature was then maintained at 150° F. and then were added: | | |
| Dibenzothiazyldisulfide | 1.0 | |
| Diorthotolylguanidine | 0.3 | 0.2 |
| Zinc salt mercaptobenzothiazole | | 0.8 |
| Barium Azocarbonate | 7.0 | 10.0 |
| Sulfur | 3.0 | 2.75 |
| | 293.55 | 271.75 |
| Specific gravity, 70° F./70° F. Calculated | 1.37 | 1.34 |
| Cure: Cold-pressed in 3 x 3 x 0.250" cavity at 2600 p.s.i. on the area of the cavity, then heated (confined). | 9 min., 335° F. | 5 min., 350° F.[e] |
| Specific gravity 70° F./70° F. after cure and expansion. | 0.49 | 0.46. |
| Cell structure | Very fine | Very fine. |

[a] Styrene, 23.5, butadiene 76.5 polymerized at 43° F. to a Mooney viscosity (ML4 at 212° F.) of 50.
[b] Styrene 23.5, butadiene 76.5 polymerized at 122° F. to a Mooney viscosity (ML4 at 212° F.) of 30.
[c] Styrene 23.8, butadiene 76.2, non-staining antioxidant, to a Mooney viscosity (ML4 at 212° F.) of 35.
[d] Styrene 85, butadiene 15 copolymer.
[e] Plus 2.5 hours 250° F. (unconfined in oven).

Example IV

The effectiveness of barium azocarbonate as a blowing agent for Neoprene W is shown in the following formulations:

| | Parts by Weight | |
|---|---|---|
| | Test H | Test I |
| Ingredient: | | |
| Neoprene W [a] | 100.0 | 100.0 |
| Stearic acid | 1.0 | 1.0 |
| Paraffin wax | 2.0 | 2.0 |
| Antioxidant | 2.0 | 2.0 |
| Magnesium oxide, extra light | 4.0 | 4.0 |
| Medium thermal carbon black | 40.0 | 40.0 |
| Fine extrusion furnace carbon black | 15.0 | 15.0 |
| Medium aromatic processing oil | 15.0 | 15.0 |
| Diethyleneglycol | 2.0 | |
| Was blended on a 2-roll mill at a temperature of approximately 100° F. for 2 minutes. Carbon blacks, processing oils, miscellaneous fillers and pigments added and mixed and blended and stock temperature maintained at 200° F. Mill was then cooled and batch temperature maintained at a maximum of 150° F. and then were added: | | |
| Barium Azocarbonate | 10.0 | 10.0 |
| Zinc oxide | 5.0 | 5.0 |
| 2-Mercaptoimidazoline | 1.0 | 1.0 |
| | 197.0 | 195.0 |
| Specific gravity, 70° F./70° F. | 1.40 | 1.38. |
| Curing conditions: Cold pressed in a 3 x 3 x 0.250" mold at 2600 p.s.i. on the area of the mold, then heated. | 5 min., 400° F.[b] | 5 min., 400° F.[b] |
| Specific gravity, 70° F./70° F. | 0.57 | 0.60. |
| Cure | 3.5 min., 450° F. | 3.5 min., 450° F. |
| Specific gravity, 70° F./70° F. | 0.58 | 0.71. |

[a] A polychloroprene.
[b] Unconfined.

Example V

The effectiveness of barium azocarbonate as a blowing agent for butyl rubber is shown in the following formulations:

|  | Parts by Weight | |
| --- | --- | --- |
|  | Test J | Test K |
| Ingredient: | | |
| Butyl 365[a] | 100.0 | 100.0 |
| Stearic acid | 1.0 | 1.0 |
| Zinc oxide | 5.0 | 5.0 |
| Fine extrusion furnace carbon black | 25.0 | 25.0 |
| Medium thermal carbon black | 35.0 | 35.0 |
| Paraffinic oil | 20.0 | 20.0 |
| Petrolatum | 3.0 | 3.0 |
| Paraffinic wax | 2.0 | 2.0 |
| Diethyleneglycol | 2.0 | |
| Butyl was blended on a 2-roll mill at a temperature of 100° F. for 2 minutes. Carbon blacks, processing oils, miscellaneous fillers and pigments added and mixed and blended. Stock temperature reached 200° F. and was held there 3 minutes to insure good dispersion. Mill was then cooled and batch temperature maintained at 150° F. maximum and then were added: | | |
| Tetra methyl thiuram disulfide | 2.0 | 2.0 |
| Zinc salt, mercaptobenthiazole | 1.0 | 1.0 |
| Barium Azocarbonate | 10.0 | 10.0 |
| Sulfur | 1.75 | 1.75 |
|  | 207.75 | 205.75 |
| Specific gravity 70° F./70° F. | 1.13 | 1.13. |
| Cure: Cold pressed in 3 x 3 x 0.250″ mold at 2600 p.s.i. on the area of the mold. | 5 min., 350° F.[b] | 5 min., 350° F.[b] |
| Specific gravity 70° F./70° F. | 0.33 | 0.44. |
| Hardness (Shore A) | 15.0 | 20.0. |
| Cell structure | Med. fine | Med. fine. |
| Cure: Cold pressed in 3 x 3 x 0.250″ mold at 2600 p.s.i. on the area of the mold. | 10.5 min., 315° F.[b] | 10.5 min., 315° F.[b] |
| Specific gravity 70° F./70° F. | 0.39 | 0.53. |
| Hardness (Shore A) | 20.0 | 27.0. |
| Cell structure | Med. fine. | Med. fine. |

[a] A copolymer of isobutylene (97%) and isoprene (3%).
[b] Unconfirmed.

Examples III through V illustrate the use of barium azocarbonate in polymers other than the high melting hydrocarbon polymers. These examples show that these polymers, conventional butadienestyrene synthetic rubber, butyl rubber, neoprene, a poly (vinyl chloride) plastisol and a poly (vinyl chloride) sheet may be blown to desirable reduced densities by the means of barium azocarbonate.

It is noted that the temperature ranges in which these five materials have been blown are well below the range desired for the high melting hydrocarbon polymers, due to the presence of activators such as stearic acid, ethylene glycol, and the like.

Although this invention is described with specific reference to preferred embodiments, it is contemplated that modifications will readily occur to those skilled in the art and familiar with this disclosure. It may be found, for instance, desirable to use smaller amounts of blowing agent, perhaps as little as 0.1 part per 100 parts of plastomer, or higher amount such as 25 parts per 100 parts of plastomer in certain specific formulations. Other plastomers, other than those specifically enumerated, and mixtures of plastomers may also be found suitable for particular uses of this invention. It is contemplated that such a modification may be made without departing from the scope of the invention.

Having thus disclosed my invention and described in detail preferred embodiments thereof, I claim and desire to secure by Letters Patent:

1. A composition suitable for blowing comprising a thermoplastic polymer derived from an ethylenically unsaturated monomer and barium azocarbonate dispersed therein in an amount effective to produce cells in said thermoplastic polymer.

2. The composition defined by claim 1 wherein the thermoplastic polymer is selected from the group consisting of polyethylene, polypropylene, copolymers of styrene and butadiene, polychloroprene, poly (vinyl chloride), natural rubber, and isobutylene-isoprene butyl rubber copolymers.

3. The method of forming blown thermoplastic polymer derived from ethylenically unsaturated monomers comprising mixing the thermoplastic with barium azocarbonate and heating the mixture to a temperature sufficient to decompose the barium azocarbonate.

4. The method defined by claim 3 wherein the thermoplastic polymer is selected from the group consisting of polyethylene, polypropylene, copolymers of styrene and butadiene, polychloroprene, poly (vinyl chloride), natural rubber, and isobutylene-isoprene butyl rubber copolymers.

References Cited in the file of this patent

UNITED STATES PATENTS

| 2,256,483 | Johnston | Sept. 23, 1941 |
| 2,496,255 | Von Glahn | Jan. 31, 1950 |
| 2,599,299 | Upson | June 3, 1952 |
| 2,739,134 | Parry et al. | Mar. 20, 1956 |
| 2,901,446 | Hawkins | Aug. 25, 1959 |

OTHER REFERENCES

Thiele: Justus Liebig's Annalen der Chemie, volume 271, page 133 (1892).

Lally et al.: Modern Plastics, volume 27, pages 111–112 (1949).

UNITED STATES PATENT OFFICE
CERTIFICATE OF CORRECTION

Patent No. 3,141,002                        July 14, 1964

Henry A. Hill

It is hereby certified that error appears in the above numbered patent requiring correction and that the said Letters Patent should read as corrected below.

Column 5, footnote "b" of the table in Example V, for "Unconfirmed" read -- Unconfined --.

Signed and sealed this 29th day of December 1964.

(SEAL)
Attest:

ERNEST W. SWIDER                          EDWARD J. BRENNER
Attesting Officer                              Commissioner of Patents